United States Patent [19]

Saito

[11] 4,070,106
[45] Jan. 24, 1978

[54] SHORT CIRCUIT FOR RECORDING HEAD OF SIMULTANEOUS RECORDING CINE CAMERA

[75] Inventor: Fumio Saito, Kawaguchi, Japan

[73] Assignee: Nihon Beru-Haueru Kabushiki Kaisha (Bell & Howell Japan, Ltd.), Higashimurayama, Japan

[21] Appl. No.: 676,582

[22] Filed: Apr. 13, 1976

[30] Foreign Application Priority Data

Apr. 22, 1975 Japan .............................. 50-54848[U]
Apr. 23, 1975 Japan .............................. 50-56310[U]

[51] Int. Cl.² .......................................... G03B 31/02
[52] U.S. Cl. ...................................... 352/27; 360/62; 307/100; 352/25
[58] Field of Search ...................... 360/62; 352/27, 25, 352/26, 30, 31, 174; 307/100

[56] References Cited

U.S. PATENT DOCUMENTS

| | | | |
|---|---|---|---|
| 2,282,957 | 5/1942 | Fields | 352/25 |
| 3,699,670 | 10/1972 | Takeda | 360/62 |
| 3,879,114 | 4/1975 | Stenzenberger | 352/27 |

*Primary Examiner*—Monroe H. Hayes
*Attorney, Agent, or Firm*—John E. Peele, Jr.; John H. Moore; Roger M. Fitz-Gerald

[57] ABSTRACT

To eliminate the recording of undesirable sounds which can occur upon starting a sound motion picture camera in which sound is recorded simultaneously as the picture is recorded, a circuit shorting switch is installed in parallel with the sound recording head, and a film transport motor control switch is arranged to function opposite to the circuit shorting switch but in cooperation with that switch to stabilize the amplifier before film movement begins.

1 Claim, 3 Drawing Figures

SHORT CIRCUIT FOR RECORDING HEAD OF SIMULTANEOUS RECORDING CINE CAMERA

The present invention relates to a sound motion picture camera, and particularly to an improvement in sound recording circuitry for eliminating undesirable noises caused by camera actuation.

Recently, sound motion picture cameras have been developed which permit recording of sound on a film simultaneously with the recording of picture images thereon. Although the sound recording systems used in such cameras enable faithful recordation of sounds, some extraneous noises are recorded likewise. Particularly, noises, such as clicks, often are recorded as the camera is actuated and film movement and sound recording begins. Although other systems are used to eliminate noises, an improved noise elimination system as hereinafter described can be used to prevent the "click" sounds from being recorded.

An object of the present invention is to provide an improved noise elimination system for use in a sound motion picture camera.

Further and other objects will be apparent from the description of the accompanying drawings in which like numerals refer to like parts.

Figure 1:
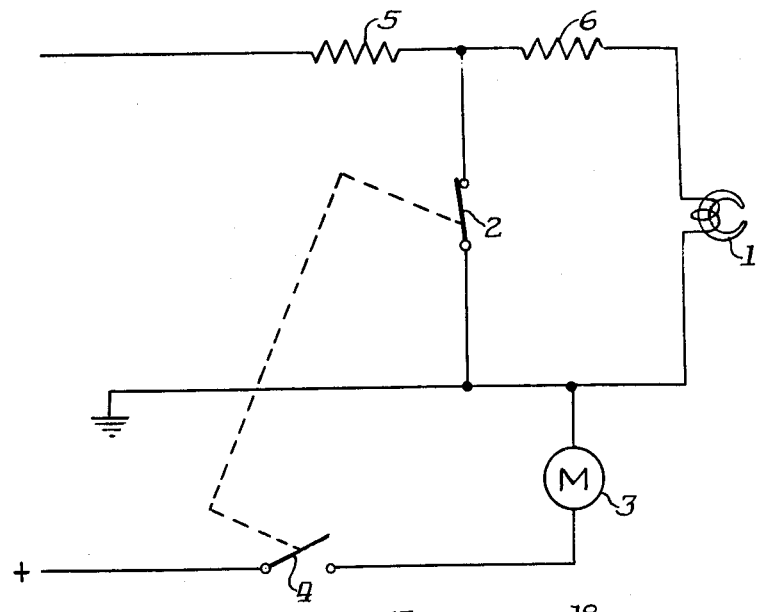
FIG. 1 is a schematic diagram of a preferred embodiment of a recording head, shorting circuit according to the present invention.
Figure 2:
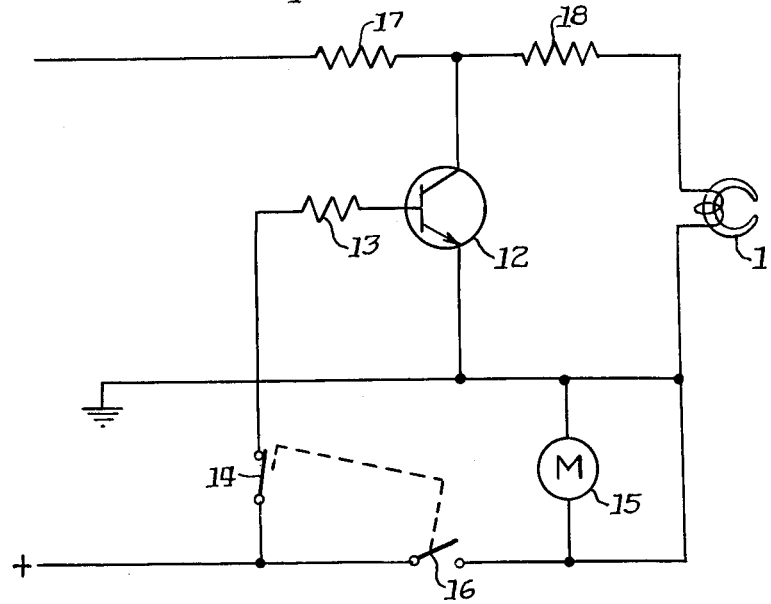
FIG. 2 is a similar diagram of an alternative embodiment.

Referring to the drawings, a circuit for a sound motion picture camera is shown including a recording head 1 across which a switch 2 is connected in parallel circuit arrangement. A film transport motor 3 is shown connected to a switch 4 which controls energization of the motor. The switches 2 and 4 function oppositely one another but in cooperation with each other responsive to actuation by a not shown start button of the camera. As switch 4 is closed to energize the motor, switch 2 is opened while the film is transported. Similarly, as the switch 4 is opened to stop transportation of the film, the switch 2 is closed. Resistors 5 and 6 are connected in the circuit too as required.

The circuitry, constructed as above described, is coupled in circuit with a not shown camera operating start button which is capable of being depressed to two conditions. When the start button is depressed to the first condition, a switch (not shown) is closed to energize the amplifier (not shown) so that sounds received by a signal source, such as a microphone, cannot be recorded. The sound signal initially flows to the resistor 5. However, the signal is not recorded even if the amplifier is in operation, since the signal cannot reach the transducer head because of the closed switch 2. Also, the film on which the sound is to be recorded is not being transported.

When the start button is depressed further from the first condition to the second condition, the film is transported as the film transporting motor is energized due to completion of the circuit by closure of the switch 4. Simultaneously, the signal can be recorded by the head 1 as the circuit through switch 2 is opened.

The switch 2, which is installed in parallel with the recording head, is coupled to operate with the switch 4 through which the motor 3 is energized. Since the switches function oppositely to each other, a noise signal which occurs at the start of the amplifier is not recorded because the signal is short-circuited around the recording head by passing through the circuitry of switch 2. Further, when the sound is permitted to pass through the circuit to the head 1 as the switch 2 is opened, the film has begun to move and the amplifier has stabilized due to the delay in depressing the start button beyond the first position to the second position. Thus, when the film is transported, the amplifier has been stabilized and no noise signal is recorded although desired sounds are recorded as the film is transported.

When the start button is depressed to the intermediate or first position, and since no signal can reach the recording head, tests may be made of the connection of the microphone and other sound inputs to the amplifier. Even if the film is in engagement with the recording head 1, the noises occurring as the switches acquire a condition are not recorded. The tests as to system effectiveness can be confirmed by an indicator lamp or monitor.

Alternative to switches 2 and 4, the circuit may be provided with a transistor 12 installed in parallel with the recording head 1. Through a resistor 13, switch 14 is connected with the base of the transistor 12 and the positive side of a power source. The film transporting motor 15 is controlled by a switch 16 which functions oppositely to switch 14, but in cooperation therewith. Components 17 and 18 are resistors required for the circuitry.

Functionally, the system is similar to the earlier described so that the film is not transported when switch 16 connected to the motor 15 is open and switch 14 is closed. The condition of these switches 14, 16 is changed by a start button (not shown) of the camera. In this embodiment, a noise signal is short-circuited by the transistor 12, and prevented from reaching the recording head 1. In the test or first position of the start button, the amplifier (not shown) is energized, but film is not transported since switch 16 is open. However, the signal path circuit through now closed switch 14 and resistor 17 causes the transistor 12 to become conductive and the head 1 to be by-passed.

When the start button is further depressed to cause the film transporting motor to be energized, the switch 16 is closed and the switch 14 is opened. The amplifier has had time to become stabilized such that the sound signal can flow to the recording head 1. Since current does not flow at the base of transistor 12, the transistor becomes non-conductive as the head is energized upon opening of the switch 14.

Figure 3:
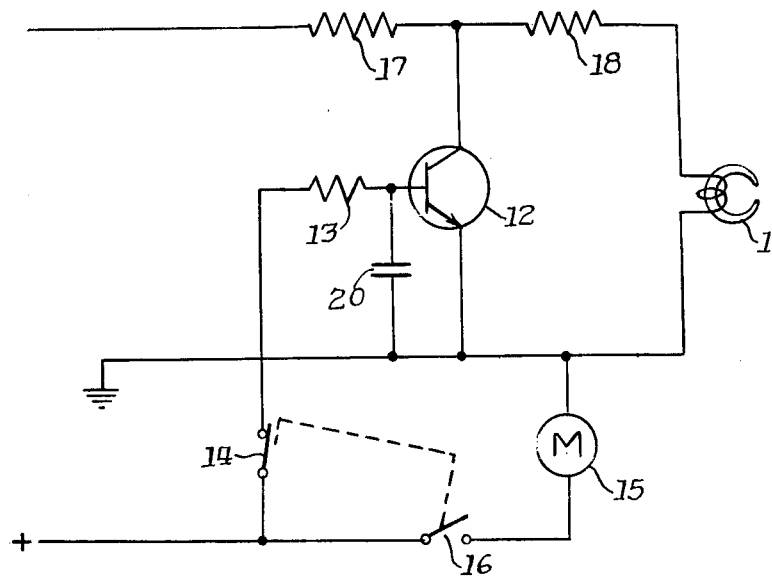
FIG. 3 is a similar diagram of another embodiment.

In still another embodiment as shown in FIG. 3, a condensor can be installed so that one end is connected between the base of transistor 12 and the resistor 13, and the other end is connected with the negative terminal of a power source. A fade effect of sound can be obtained as the transistor gradually becomes non-conductive and permits the recording head to gradually become operative as the condensor discharges after the current flow to the transistor is interrupted upon opening of the switch 14. Hence, the sound fades in as the film transport motor comes up to speed thereby preventing garbling of the sound recorded in the first instance of recording.

In these several embodiment, the recording head is caused to be de-energized as the start button is released so that the motor drive switch is opened and the recording head connecting switch is closed.

While this invention has been particularly shown and described with respect to preferred embodiments, it will be understood that various changes and modifications may be made without departing from the spirit and scope of the invention.

What is claimed is:

1. Improvements in a sound motion picture camera having film transporting motor for moving an elongated film in the camera; and a sound recording circuit including an amplifier and a recording head relative to which film is moveable for simultaneous recording of sound as images are recorded on the film in response to the actuation of a camera start button, the improvement in the sound recording system comprising:

a transistor coupled in parallel with the recording head for selectively shunting audio signals around the recording head;

a first switch means operable between open and closed conditions for rendering said transistor conductive when closed and non-conductive when opened;

a condenser coupled in circuit with said transistor for delaying the change of states of said transistor between a non-conductive state and a conductive state;

a second switch means operable between open and closed conditions and disposed in series circuit with the film transporting motor for selectively actuating and deactuating the motor;

said first and second switch means being adapted to operate simultaneously in opposite condition in cooperation with one another responsive to actuation of the camera start button but subsequent to the energization of the amplifier, whereby when said second switch means is in a closed condition, said first switch means is in an open position, the film transporting motor is actuated and said transistor is rendered gradually non-conductive to provide a sound fade-in which begins only after the amplifier is energized.

* * * * *